US012022436B2

(12) United States Patent
Deng et al.

(10) Patent No.: US 12,022,436 B2
(45) Date of Patent: Jun. 25, 2024

(54) CONTROL INFORMATION TRANSMISSION AND SENSING IN WIRELESS SYSTEMS

(71) Applicant: INTERDIGITAL PATENT HOLDINGS, INC., Wilmington, DE (US)

(72) Inventors: Tao Deng, Roslyn, NY (US); Martino M. Freda, Laval (CA); Tuong Duc Hoang, Montreal (CA); Aata El Hamss, Laval (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 24 days.

(21) Appl. No.: 17/265,732

(22) PCT Filed: Aug. 7, 2019

(86) PCT No.: PCT/US2019/045457
§ 371 (c)(1),
(2) Date: Feb. 3, 2021

(87) PCT Pub. No.: WO2020/033513
PCT Pub. Date: Feb. 13, 2020

(65) Prior Publication Data
US 2021/0176735 A1    Jun. 10, 2021

Related U.S. Application Data

(60) Provisional application No. 62/715,510, filed on Aug. 7, 2018.

(51) Int. Cl.
*H04W 72/02* (2009.01)
*H04B 17/318* (2015.01)
(Continued)

(52) U.S. Cl.
CPC .......... *H04W 72/02* (2013.01); *H04B 17/318* (2015.01); *H04W 4/40* (2018.02);
(Continued)

(58) Field of Classification Search
CPC ..... H04W 72/02; H04W 4/40; H04W 72/543; H04B 17/318
See application file for complete search history.

(56) References Cited

U.S. PATENT DOCUMENTS 10,219,292 B2   2/2019  Damnjanovic et al.
10,772,076 B2   9/2020  Tang et al.
(Continued)

FOREIGN PATENT DOCUMENTS

CN   101841866 B   12/2012
EP   3461221 A1   3/2019

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
(Continued)

*Primary Examiner* — Won Tae C Kim
(74) *Attorney, Agent, or Firm* — Volpe Koenig

(57) ABSTRACT

A 5G UE achieves flexible SL time resource granularity by determining which UL/Flexible symbols/slots belong to a symbol-based SL resource pool and a slot-based SL resource pool based on SFI in RRC/GC-PDCCH. The UE then determines which resources are available in each pool based on sensing and selects a resource pool to use so that QoS/latency requirements are met.

18 Claims, 12 Drawing Sheets

(51) Int. Cl.
  *H04W 4/40* (2018.01)
  *H04W 24/10* (2009.01)
  *H04W 72/0453* (2023.01)
  *H04W 72/543* (2023.01)

(52) U.S. Cl.
  CPC ....... *H04W 24/10* (2013.01); *H04W 72/0453* (2013.01); *H04W 72/543* (2023.01)

(56) References Cited

U.S. PATENT DOCUMENTS

| | | | |
|---|---|---|---|
| 2011/0299500 A1 | 12/2011 | Papasakellariou et al. | |
| 2019/0090299 A1* | 3/2019 | Ang | H04L 5/0053 |
| 2021/0168807 A1* | 6/2021 | Jung | H04L 27/26025 |
| 2021/0176747 A1* | 6/2021 | Yang | H04L 5/0044 |
| 2021/0212067 A1* | 7/2021 | Hwang | H04W 72/0453 |
| 2021/0377806 A1* | 12/2021 | Osawa | H04W 4/40 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

InterDigital Inc., "NR Sidelink Physical Layer Structures and Procedures," 3GPP TSG RAN WG1 Meeting #94, R1-1809094, Gothenburg, Sweden (Aug. 20-24, 2018).

InterDigital Inc., "Nr Sidelink Physical Layer Structures and Procedures," 3GPP TSG RAN WG1 Meeting #94bis, R1-1811213, Chengdu, China (Oct. 8-12, 2018).

InterDigital Inc., "On Physical Layer Structure Design," 3GPP TSG RAN WG1 Meeting #95, R1-1813226, Spokane, USA (Nov. 12-16, 2018).

InterDigital Inc., "Physical Layer Structure for NR V2X Sidelink," 3GPP TSG RAN WG1 Ad-Hoc Meeting 1901, R1-1900793, Taipei, Taiwan (Jan. 21-25, 2019).

Qualcomm Incorporated, "Remaining issues on slot format indication," 3GPP TSG RAN WG1 #90bis, R1-1718556, Prague, Czech Republic (Oct. 9-13, 2017).

Third Generation Partnership Project, "Technical Specification Group Radio Access Network; NR; Physical layer procedures for data (Release 15)," 3GPP TS 38.214 V15.2.0 (Jun. 2018).

Third Generation Partnership Project, "Technical Specification Group Radio Access Network; NR; Physical layer procedures for data (Release 15)," 3GPP TS 38.214 V15.6.0 (Jun. 2019).

Third Generation Partnership Project, "Technical Specification Group Radio Access Network; Study on Scenarios and Requirements for Next Generation Access Technologies; (Release 14)," 3GPP TR 38.913 V14.1.0 (Dec. 2016).

Third Generation Partnership Project, "Technical Specification Group Radio Access Network; Study on Scenarios and Requirements for Next Generation Access Technologies; (Release 14)," 3GPP TR 38.913 V14.3.0 (Jun. 2017).

Third Generation Partnership Project, "Technical Specification Group Radio Access Network; Study on Scenarios and Requirements for Next Generation Access Technologies; (Release 15)," 3GPP TR 38.913 V15.0.0 (Jun. 2018).

ZTE, "Consideration on short TTI based PC5 operation," 3GPP TSG-RAN WG2 Meeting #99, R2-1708511, Berlin, Germany (Aug. 21-25, 2017).

Huawei et al., "Remaining issues on group-common PDCCH," 3GPP TSG RAN WG1 Meeting #92, R1-1801336, Athens, Greece (Feb. 26-Mar. 2, 2018).

Third Generation Partnership Project, "Technical Specification Group Radio Access Network; NR; Physical layer procedures for control (Release 15)," 3GPP TS 38.213 V15.0.1, R1-1803554 (Mar. 2018).

Third Generation Partnership Project, "Technical Specification Group Radio Access Network; NR; Physical layer procedures for control (Release 15)," 3GPP TS 38.213 V15.2.0 (Jun. 2018).

Third Generation Partnership Project, "Technical Specification Group Radio Access Network; NR; Physical layer procedures for control (Release 15)," 3GPP TS 38.213 V15.6.0 (Jun. 2019).

* cited by examiner

CONTROL INFORMATION TRANSMISSION AND SENSING IN WIRELESS SYSTEMS

CROSS REFERENCE TO RELATED APPLICATION

This application is the U.S. National Stage, under 35 U.S.C. § 371, of International Application No. PCT/US2019/045457 filed Aug. 7, 2019, which claims the benefit of U.S. Provisional Application No. 62/715,510 filed Aug. 7, 2018, the contents of which are hereby incorporated by reference.

BACKGROUND

Long-Term Evolution (LTE) Vehicular-to-Everything (V2X) communication may enable safe, reliable and efficient transportation services. A subframe may be used as LTE V2X side link (SL) time resource and thereby may belong to a SL subframe pool if the subframe is an LTE uplink (UL) subframe. An LTE subframe may be a SL subframe, if the subframe is not a down link (DL) or special subframe, such as in a Time Division Duplex (TDD) system, if the subframe is not pre-configured for SL synchronization signal (SLSS) transmission, if the subframe is not a reserved subframe (derived from a bit map configured by higher layers), and if the subframe is indicated as available in the bit map configured by higher layers.

The subframes of the SL subframe pool may be arranged in increasing order of subframe index, which may range from 0 to 10240 (for each SFN cycle). The LTE V2X SL time resource and scheduling granularity may be fixed at one subframe and, thus, a SL Transmission Time Interval (TTI) may be one subframe at 1 ms. In LTE TDD systems, the SL subframe pool may only indicate UL subframes indicated in a cell-specific DL/UL assignment semi-statically configured by the network.

SUMMARY

A vehicle to everything (V2X) user equipment (UE) for operation in a fifth generation (5G) wireless network, and corresponding method are described herein. The UE comprises at least a transceiver, and a processor. The processor is configured to determine a symbol-based resource pool and a slot-based resource pool for sidelink (SL) transmission to another V2X UE. The processor and transceiver are configured to perform measurements of the symbol-based resource pool and the slot-based resource pool to determine available resources. The processor is configured to determine, based on a quality of service (QoS) associated with data for transmission, which available resources are candidate resources selectable for transmission of the data. The symbol-based resource pool for SL transmission to another V2X UE may comprise both uplink (UL) symbols and flexible symbols. The slot-based resource pool for SL transmission to another V2X UE may comprise both uplink (UL) slots and flexible slots. The processor may determine that the QoS associated with data for transmission cannot be met by available resources of a symbol-based resource pool based on the measurements. In this case, the processor selects available candidate resources from a slot-based resource pool for transmission of the data. The processor may also determine that the QoS associated with data for transmission cannot be met by available resources of a slot-based resource pool based on the measurements. In this case, the processor selects available candidate resources from a symbol-based resource pool for transmission of the data

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
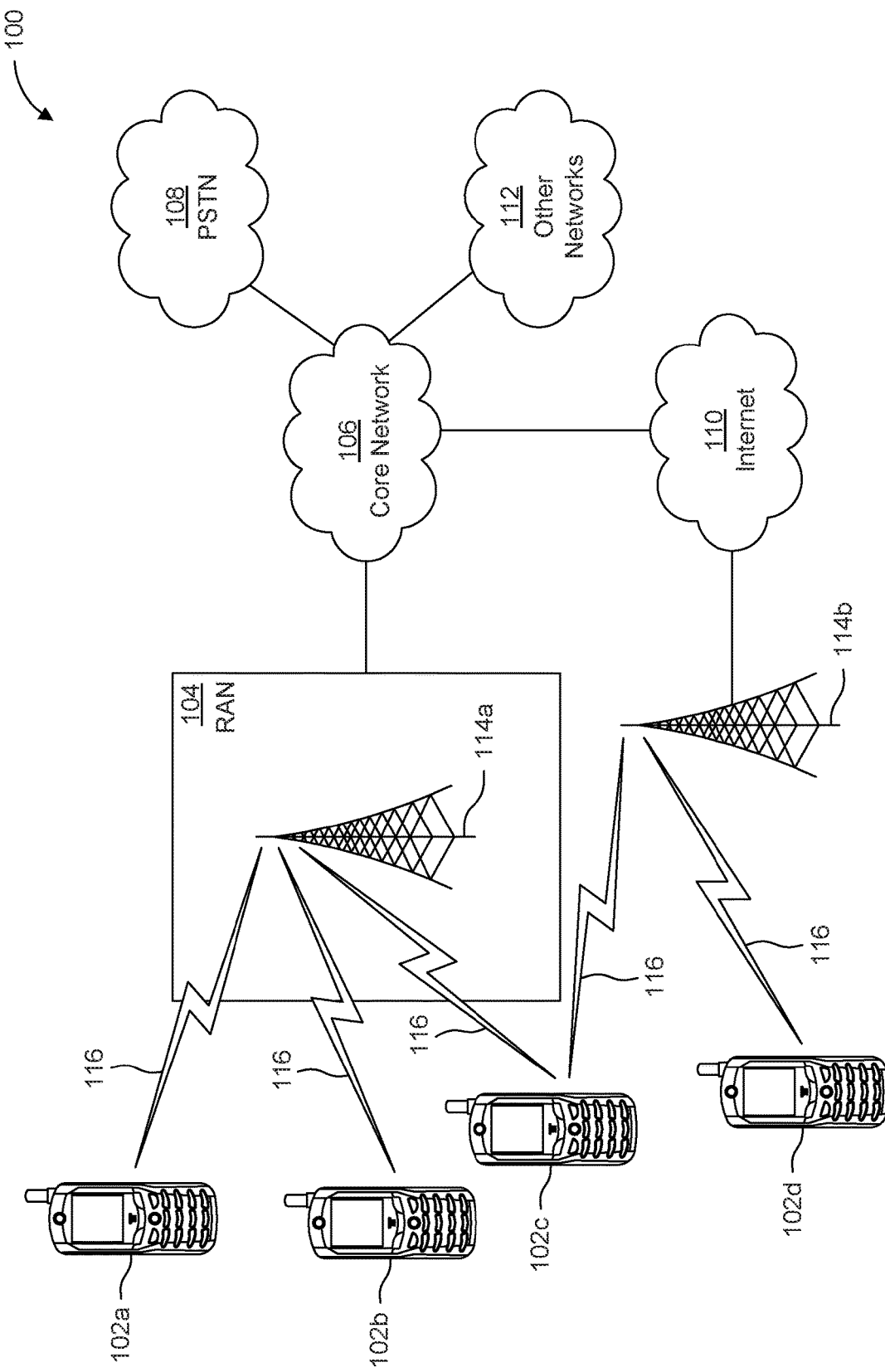
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like.

For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
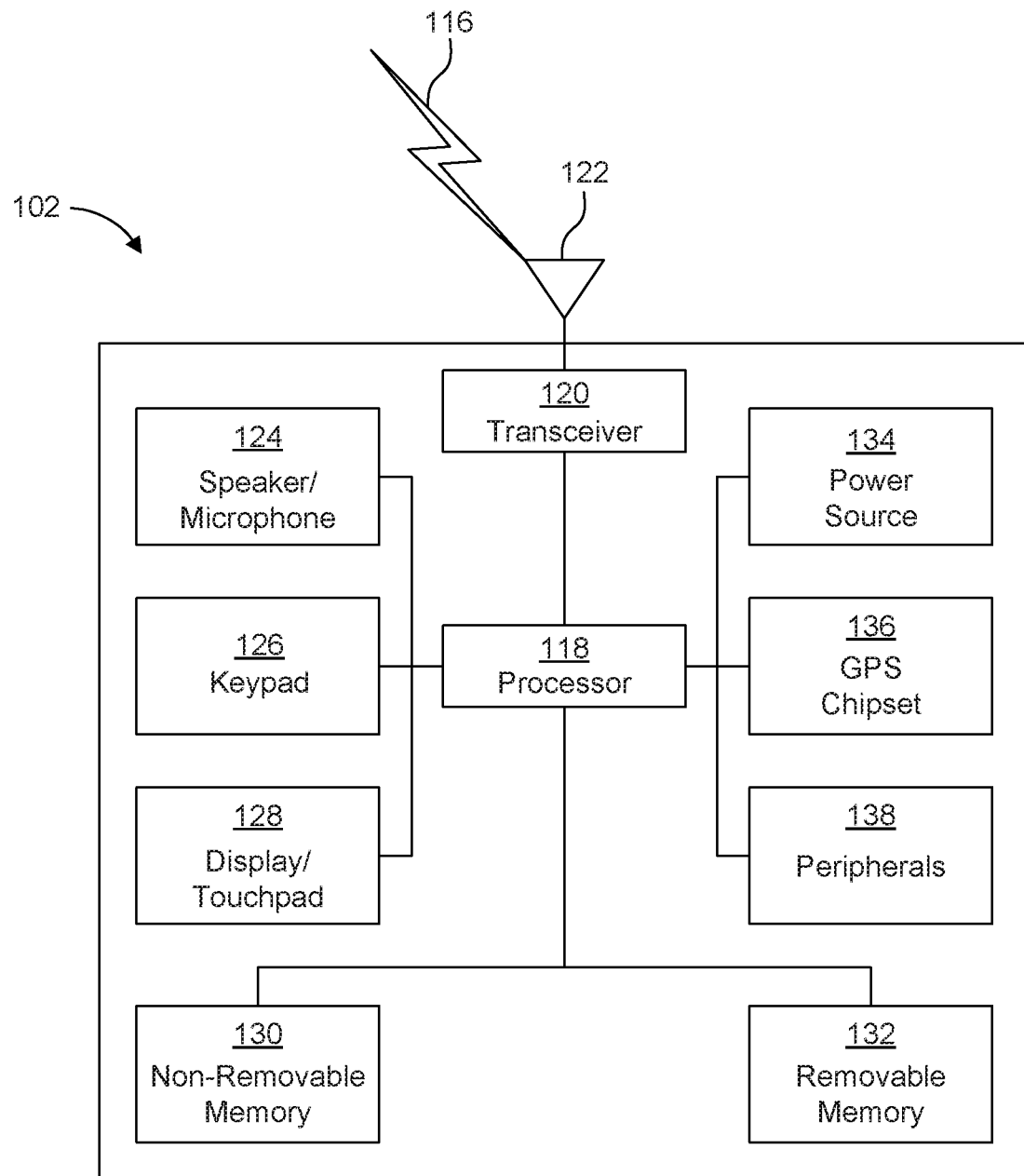
FIG. 1B is a system diagram illustrating an example wireless transmit/receive unit (WTRU) that may be used within the communications system illustrated in FIG. 1A according to an embodiment.
Figure 1C:
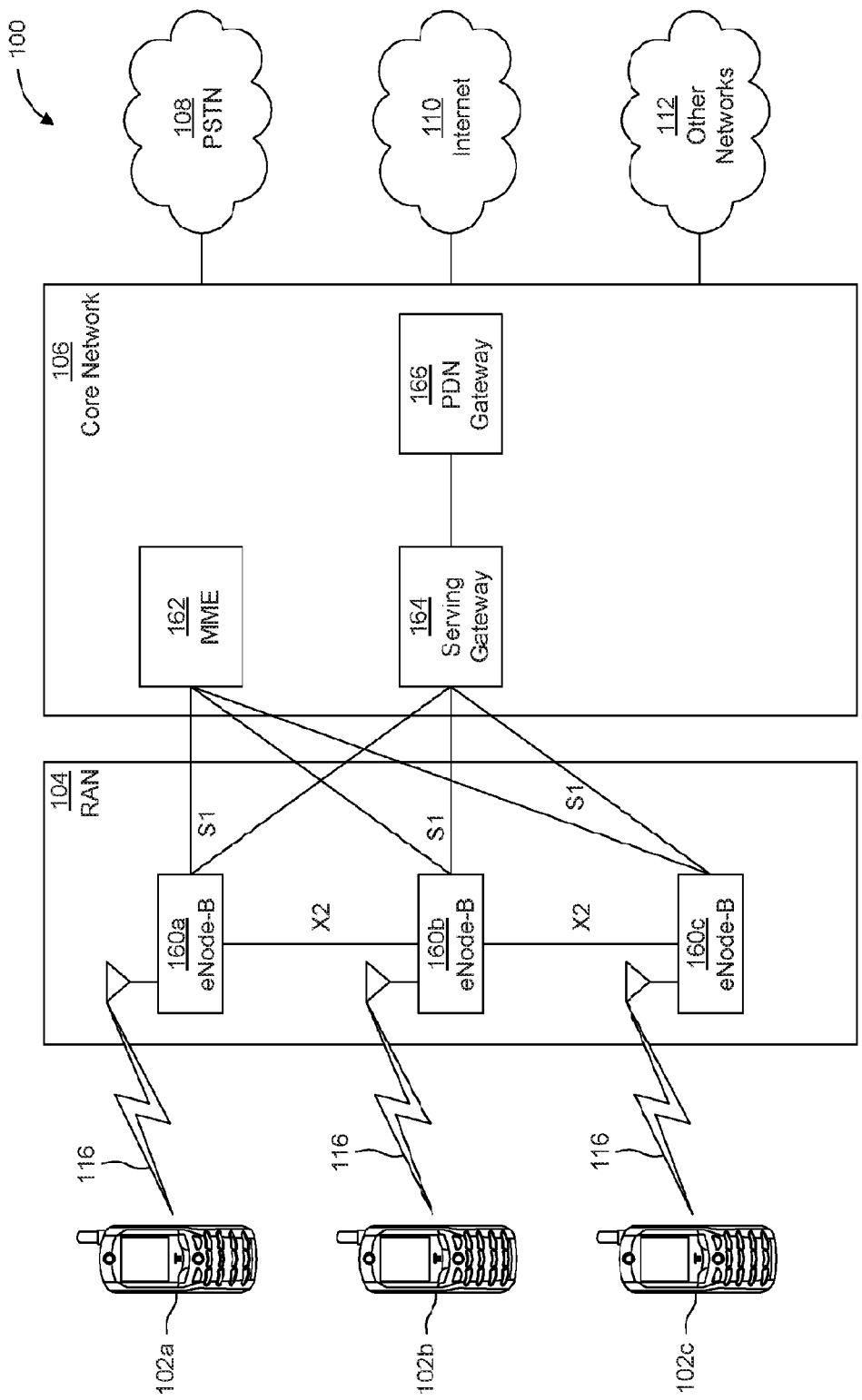
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
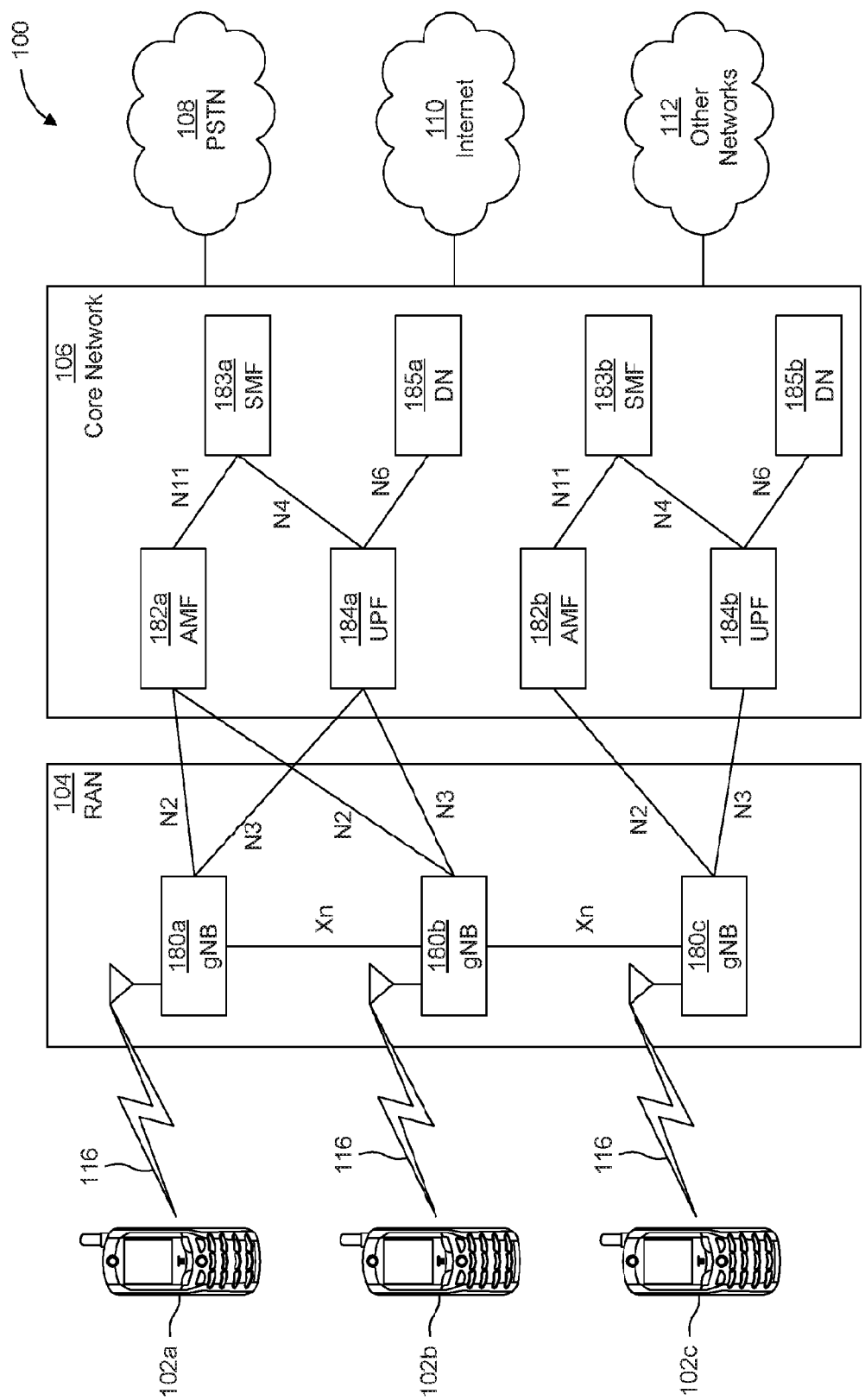
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

LTE V2X SL frequency resources may be determined based on subchannels configured by higher layers. Each subchannel may include a set of contiguous resource blocks (RB) defined in the LTE UL frequency band. The starting RB and the number of RBs of a subchannel may be explicitly indicated in higher layer configurations.

The LTE V2X SL Control Information (SCI), i.e. SCI format 1, may be transmitted in the Physical SL Control CHannel (PSCCH) and carry scheduling information pertaining to the transmission of the associated PSSCH. The SCI format 1 includes bit fields for frequency resource location of initial transmission, modulation and coding scheme (MCS), priority of the transport block carried in PSSCH, time gap between initial transmission and retransmission, retransmission index, and/or resource reservation.

For transmission mode 3, LTE V2X SL scheduling may be done by the network, in a GNodeB scheduler, for example, and a UE may determine the SCI format 1 content based on the Downlink Control Information (DCI) format 5A received in a LTE DL transmission. For transmission mode 4, the scheduling and the corresponding SCI format 1 content may be based on UE sensing and UE higher layer pre-configurations without network involvement.

The LTE V2X PSCCH and its associated PSSCH may be multiplexed in the frequency domain, i.e. transmitted in the same subframe. The frequency resource allocation of these two channels can be configured as adjacent or non-adjacent. In the adjacent configuration, the PSCCH and PSSCH are transmitted in adjacent RBs with PSCCH occupying the first two RBs. In the non-adjacent configuration, two separate subchannel pools are configured for the PSCCH and PSSCH.

A New Radio (NR) Uu resource configuration may support both slot- and non-slot-based time resource configuration for scheduling and transmission. The slot-based time resource may be based on one slot of 14 symbols regardless of numerology and scheduling, and a TTI may be fixed at one slot in duration. The non-slot-based, i.e. mini-slot-based, time resource can be based on 2, 4 or 7 symbols per the NR R15 standard, and accordingly there can be multiple scheduling instances within a slot. The resulting finer scheduling and transmission granularity provides flexibility in supporting NR applications with different requirements on data rate, latency and reliability.

For NR TDD systems, the NR Uu interface may support highly flexible DL and UL time resource assignment by adopting both semi-static and dynamic DL/UL assignments using a slot format configuration. The semi-static slot format configuration may be transmitted in cell-specific system information broadcast (SIB) transmissions and UE-specific Radio Resource Control (RRC) configuration messages. A cell-specific slot format configuration may allocate symbols, such as DL, UL or flexible symbols. The flexible symbols may be subsequently re-assigned as DL or UL symbols by UE-specific slot format configuration, which may be semi-static or dynamic. The UE-specific slot format configuration may be signaled using RRC signaling and may include indications on a per-slot basis as to which flexible symbol(s) is/are re-assigned as DL or UL symbols. The flexible symbols without such indication may remain as flexible symbols.

The remaining flexible symbols may be re-assigned as DL or UL symbols on a dynamic basis by the network via a slot format indicator (SFI) index transmitted in DCI format 2_0 carried in Group Common PDCCH (GC-PDCCH). A UE may monitor the DCI format 2_0 with SFI radio network temporary identifier (RNTI) and the received SFI index may indicate which pre-configured slot format combination the UE is to apply for a pre-configured period. A DL scheduling assignment (DCI format 0_0/0_1) or UL grant (DCI format 1_0/1_1) received in each slot can further re-assign flexible symbols as DL or UL. For example, when a UE receives a DCI format 1_1 in a slot scheduling a PDSCH at an existing flexible symbol, the UE may consider the symbol as DL symbol (only in this slot) and receive the scheduled PDSCH accordingly.

When a symbol is assigned as DL or UL symbol by a cell-specific slot format configuration, the symbol may not be able to be re-assigned by a UE-specific slot format configuration, either semi-statically or dynamically. Also, when a symbol is assigned as DL or UL symbol by a UE-specific semi-static configuration, the symbol may not be able to be re-assigned by a UE-specific dynamic slot format configuration or by scheduling DCIs. Basically, re-assignment may only apply to flexible symbols. Both semi-static and dynamic UE-specific slot format configuration supported by NR to re-assign such flexible symbols may provide efficient time resource allocation adapted to UE-specific service types and traffic pattern.

As disclosed herein, LTE V2X time resource granularity for SL operation may be on a one subframe basis. In TDD systems, a LTE V2X UE may determine a SL subframe pool based on only UL subframes assigned in a cell-specific DL/UL configuration. The resulting SL time resource granularity and pattern, e.g. a subframe pool, is common to UEs and may not cause ambiguity regarding a SL transmission duration, i.e. a TTI, and transmission instance, i.e. start of the TTI, which may be the start of a subframe in LTE systems.

There may be a mismatch of UE-specific SL TTIs and misalignment of SL transmissions between UEs. In NR systems, an NR V2X UE may determine a SL time resource based on UE-specific time resource and a slot format configuration as discussed herein regarding NR Uu resource configuration. NR V2X use cases may impose more stringent latency requirement than LTE V2X use case and, thus, NR V2X UEs may use smaller SL time resource granularity, e.g. in terms of symbols instead of slots or TTIs. In addition, NR V2X UEs may use flexible symbols for SL operation to increase transmission and scheduling instances. As a result, two NR V2X UEs may not be able to communicate with each other due to a mismatch of TTI and/or misalignment of the transmission instances. For example, an NR V2X UE may transmit using a 4-symbol TTI, and another UE using a one-slot TTI may not be able to receive the transmission. Also, two NR V2X UEs using 4-symbol TTI may use different start symbols as the start of the SL TTI due to the different slot format configuration indicated in a SFI, and SL transmission between these two UEs may be misaligned. Accordingly, new mechanisms with configuration flexibility and low signaling overhead are disclosed that may enable coordination of the SL transmission time resource allocation between NR V2X UEs, which determine the time resource based on UE-specific configurations.

SL time resources may experience fragmentation and may result in inefficient resource utilization. As NR V2X UEs apply different SL transmission granularity and patterns, resource utilization by SL transmissions may become fragmented in the time domain, especially for an SL transmission mode without central network scheduling (e.g. one equivalent to LTE SL transmission mode 4). In this transmission mode, a NR V2X UE may autonomously select time and frequency resources and schedule its SL transmission based on its own sensing results in terms of resource availability in both the time and frequency domains. LTE V2X sensing algorithms may be based on fixed candidate time resources of one subframe as disclosed herein. Thus, the time resource availability is always evaluated in terms of a subframe and each LTE V2X UE's transmission occupies the time resource with a uniform granularity of one subframe.

NR V2X UEs may have UE-specific sensing and transmission granularity, and the SL transmissions of different NR V2X UEs may occupy non-contiguous time domain resources of different length, e.g. of one slot or multiple symbols. An SL transmission mode with central network scheduling, e.g. one equivalent to LTE SL transmission mode 3, may have better reliability and lower latency as the network has the knowledge of all NR V2X UE's time resource configuration and may align them in time domain scheduling, e.g. by filling up a slot with non-slot-based SL transmissions of different duration. For an SL transmission mode without central network scheduling though, new mechanisms are required to achieve such efficient utilization of time resources.

A UE may determine STRBs for SL operation including transmission, reception and sensing based on received semi-static and/or dynamic UE slot format configurations. A UE may determine a cell-specific STRB based on the semi-static UE slot format configurations received in the system information broadcast (SIB) transmission. A UE may determine a UE-specific STRB based on the semi-static UE slot format configuration received in RRC signaling and/or dynamic UE slot format configuration indicated in SFI in DCI format 2_0 in GC-PDCCH.

According to various network implementations, a UE may determine a slot-based and/or symbol-based STRB based on the scheduled UL symbols and/or flexible symbols. A UE may determine a slot-based STRB that may include a slot including all UL symbols (i.e. an uplink slot), a slot including all flexible symbols, and/or a slot including both UL and flexible symbols. A UE may determine a symbol-based STRB that may include a number of consecutive uplink symbols, flexible symbols, and/or flexible and uplink symbols.

According to various implementations, the minimum number of symbols of one STRB may be based on UE capability in terms of time required to decode SL control information, e.g. a minimum reception duration. A UE may determine a set of STRBs, including STRBs of different properties as summarized in Table 1 below. A flexible symbol assigned in one or more SIBs may be considered UE-specific, because it may be re-assigned to a DL or a UL symbol via UE-specific signaling. The use of a common denotation of STRB may reduce signaling between NR V2X UEs required to communicate the different UE-specific SL time resource configurations and STRB properties used by each UE.

may perform sensing on a per-STRB basis using a sensing STRB that may be different from the STRB used for transmission and reception.

Figure 2:
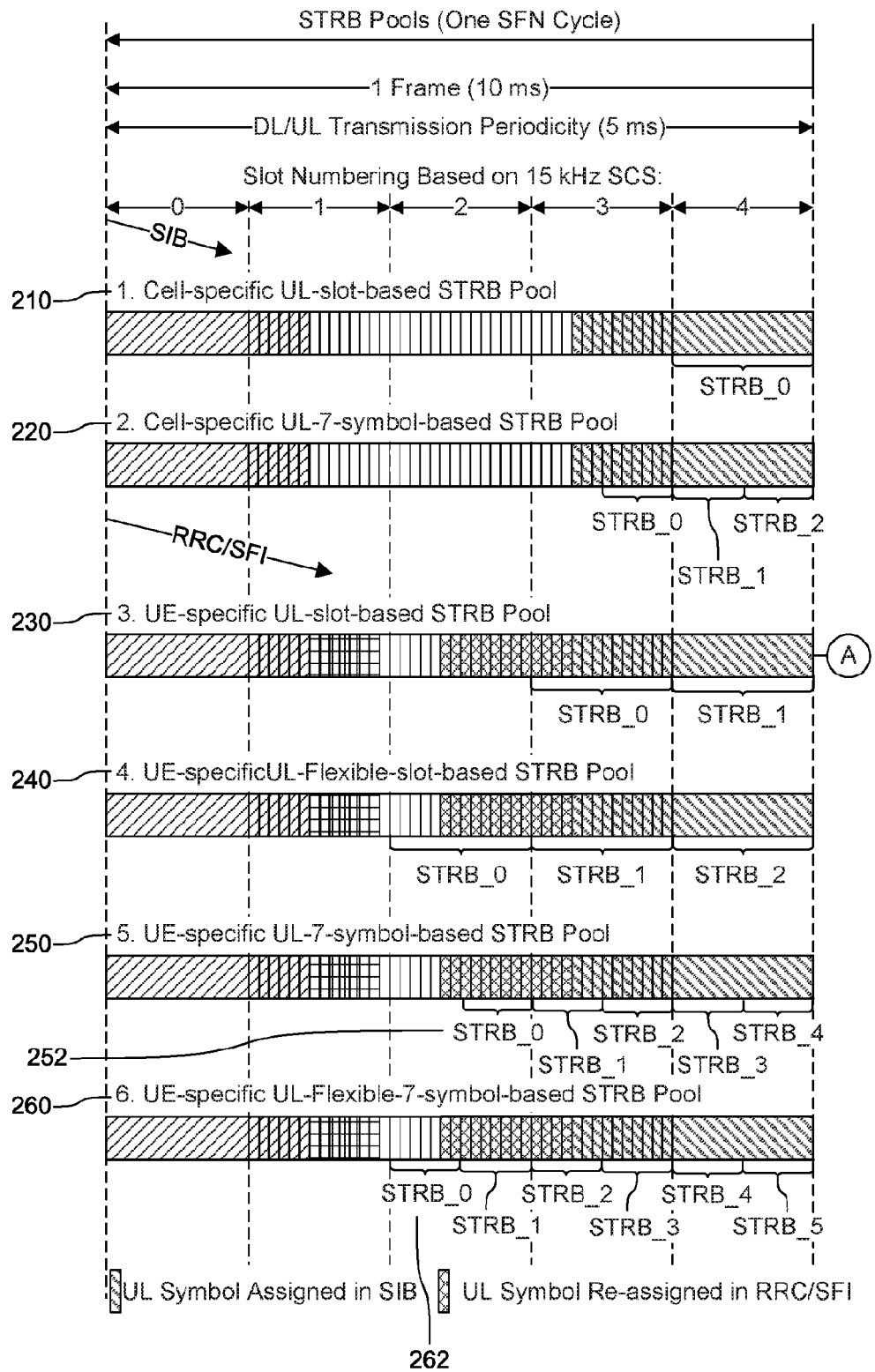
FIG. 2 is a diagram of example SL time resource block (STRB) pools based on user equipment (UE) slot format configurations.
Figure 2:
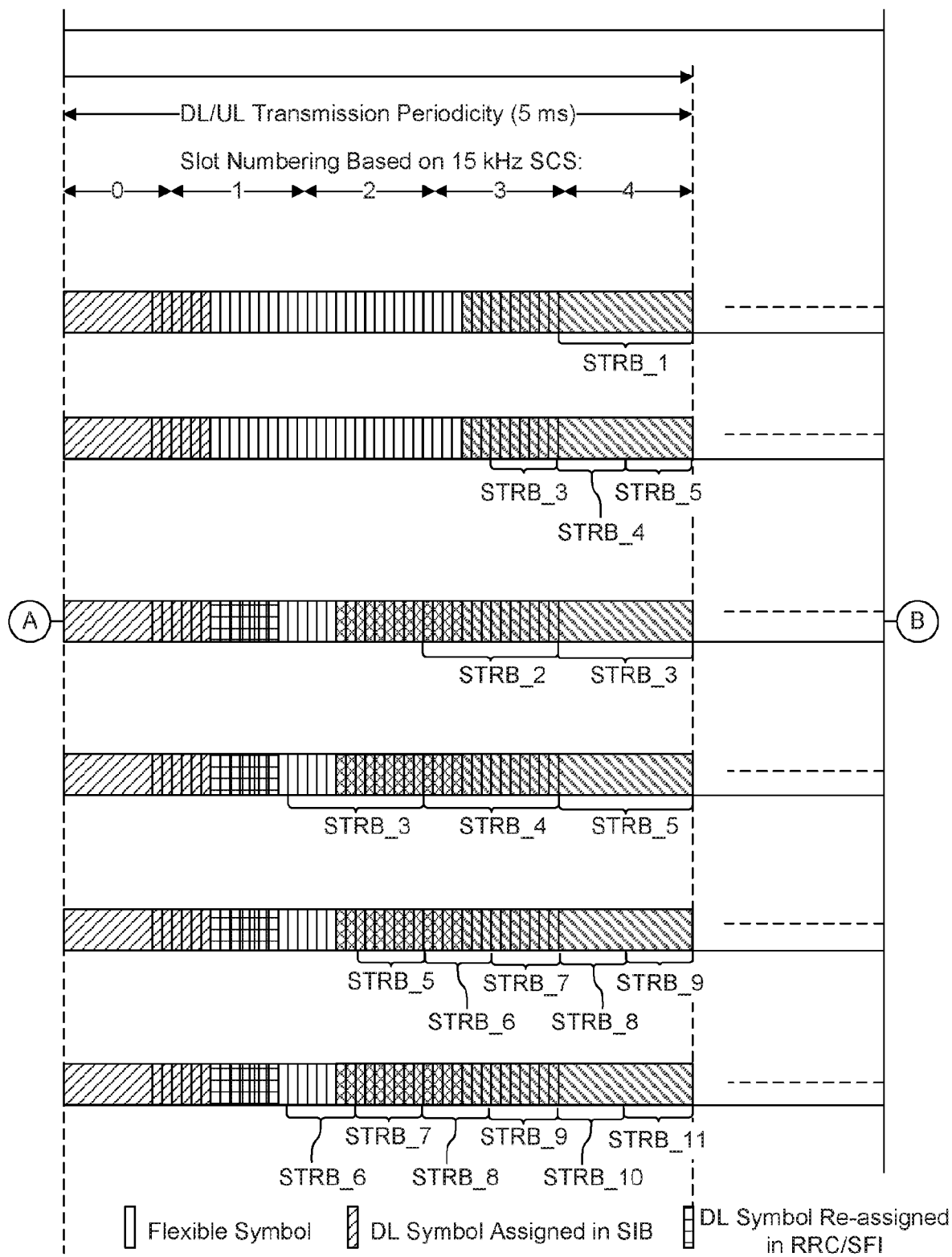
Figure 2:
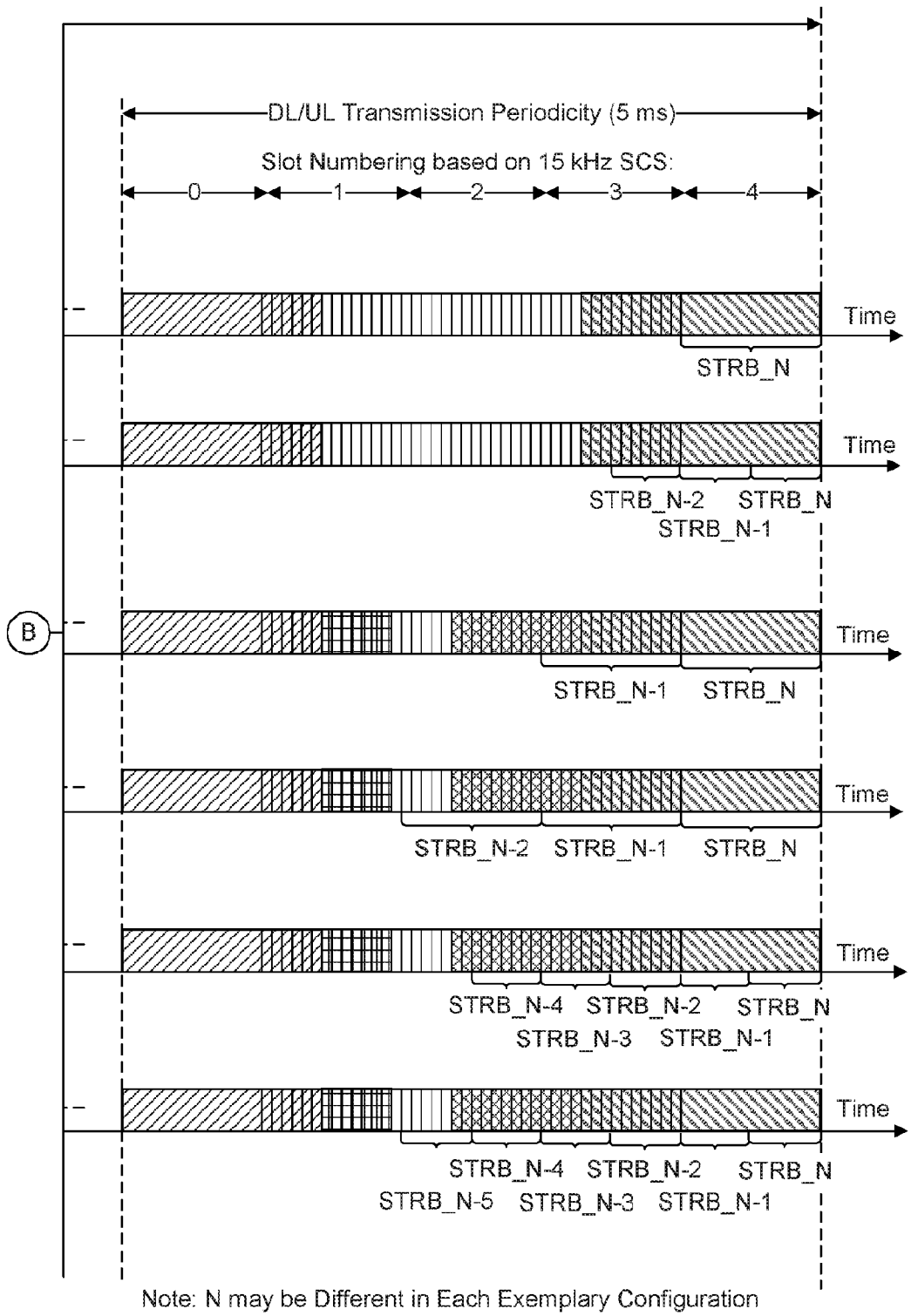

The example disclosed slot format configuration and resulting STRBs are illustrated in FIG. 2 using 15-kHz SCS and 5-ms DL/UL transmission periodicity. A UE may receive a cell-specific DL/UL configuration that assigns a DL slot in the beginning of the DL/UL transmission period, several DL symbols, flexible symbols and UL symbols, and a UL slot in the end of the transmission period. The UE may subsequently receive a slot format configuration in RRC signaling and SFI in DCI 2_0 that re-assigns the flexible symbols to DL or UL symbols. A UE may update and determine the set of STRBs based on received RRC signaling (semi-statically) and/or SFI in a GC-PDCCH (dynamically).

A UE may determine a set of STRB pools based on the disclosed STRB properties and SL time resource configurations as shown in FIG. 2. The SL time resource configurations may provide a set of rules for STRB pool determination. The set of rules may include a rule that a UE may determine a cell-specific STRB pool using UL-slot-based STRBs and/or UL-symbol-based STRBs based on UL symbols assigned in the slot format configuration received in a SIB, for example, STRB pool 1 (210) and STRB pool 2 (220) in FIG. 2.

The set of rules may include a rule that a UE may determine a UE-specific STRB pool using UL-slot-based STRBs and/or UL-symbol-based STRBs based on UL symbols assigned and/or re-assigned in the slot format configurations received in a SIB, RRC signaling and/or SFI in DCI format 2_0, for example, STRB pool 3 (230) and STRB pool 4 (240) in FIG. 2.

The set of rules may include a rule that a UE may determine a UE-specific STRB pool using UL-slot-based STRBs, flexible-slot-STRBs, UL-symbol-based STRBs, and/or flexible-symbol-based STRBs based on UL symbols and/or flexible symbols assigned and/or re-assigned in slot format configurations received in a SIB, RRC signaling and/or SFI in DCI format 2_0. This is shown in FIG. 2 by for example, STRB pool 5 (250) and STRB pool 6 (260).

The set of rules may include a rule that a UE determines a UE-specific STRB pool using flexible-slot-based STRBs

TABLE 1

STRB type and composition based on the slot format configurations

| STRB | Semi-static | Dynamic | |
|---|---|---|---|
| Cell-specific (slot-based and symbol-based) | UL symbols assigned in system information broadcast transmission | N/A | |
| UE-specific (slot-based and symbol-based) | Flexible symbols assigned in system information broadcast transmission UL symbols re-assigned from flexible symbols in RRC signaling | UL symbols re-assigned from flexible symbols in SFI in DCI format 2_0 when semi-static slot format configured is provided | UL and flexible symbols assigned in SFI in DCI format 2_0 when semi-static slot format configured is not provided |

A UE may determine one STRB as the minimum time resource unit for SL transmission, reception and sensing. For example, a UE may transmit and receive one transport block in one cell-specific and slot-based STRB, i.e. SL TTI of one slot. In another example, a UE may use one UE-specific and symbol-based STRB as one TTI for the SL operation. A UE and/or flexible-symbol-based STRBs based on flexible symbols assigned in slot format configurations received in a SIB, RRC signaling and/or SFI in DCI format 2_0.

The set of rules may include a rule that a UE determines a STRB duration of a symbol-based STRB pool based on a configured set of STRB durations, e.g. 2-symbols, 4-symbols, 7-symbols, and 1-slot in duration. The STRB duration configuration may be based on UE capability and/or the SL service type supported by the UE.

The set of rules may include a rule that a UE is configured with a set of STRB starting positions, such as symbol indices, for a symbol-based STRB. For example, a UE may assign two 7-symbol STRBs (252 and 262) with starting position symbol 0 (262) and symbol 7 (252) as shown in STRB pool 5 (250) and 6 (260) in FIG. 2. The STRB starting position configuration may ensure a symbol-based STRB does not straddle two consecutive slots. It may also reduce the misalignment of the symbol-based STRBs between NR V2X UEs.

The set of rules may include a rule that a UE is configured with a bitmap associated with the slot format configuration, and each bit in the bitmap indicates whether the time resource, e.g. a slot and/or a symbol and/or STRB, is available for SL operation. The UE may assign such time resources indicated as available to STRB pools.

A UE may arrange the STRBs assigned to one STRB pool in increasing order of STRB index as depicted in FIG. 2 in each STRB pool period, e.g. over one SFN cycle of 1024 frames. A UE may update the UE-specific STRBs and STRB pools upon receiving a slot format configuration in RRC signaling and/or SFI in DCI 2_0 in GC-PDCCH.

In another embodiment, a UE may be configured with a set of SL BWPs each with an associated numerology. A UE may be configured with a set of subchannels in each SL BWP and the subchannel configuration may include the number of RBs and the starting RB index. A UE may determine a set of SL BWPs to be associated with one or multiple STRB pools based on the one or multiple STRB properties. According to one embodiment, a UE may determine a set of SL BWPs non-overlapping with any configured UL BWPs for UL-slot-based STRBs and/or UL-symbol-based STRBs (for example, based on network configuration). This may help avoid causing in-device interference between the UE's UL and SL transmissions.

Figure 3:
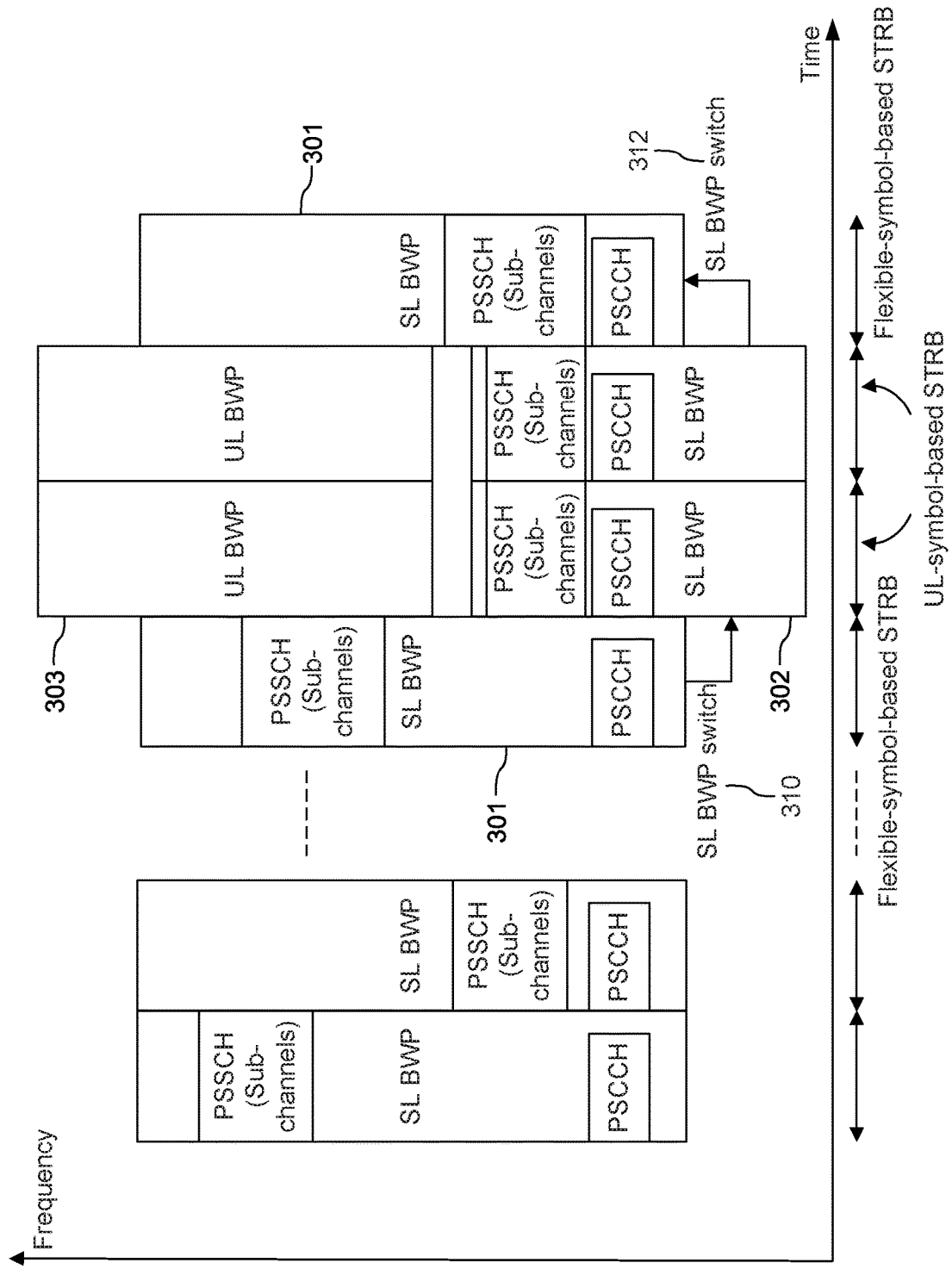
FIG. 3 is a diagram of an example SL frequency resource allocation based on bandwidth part (BWP) and subchannels.

A UE may determine a set of SL BWPs partially or completely overlapping with an UL BWP for flexible-slot-based STRBs and/or flexible-symbol-based STRBs. As no UL transmission may be scheduled during such STRBs, the UE may apply a SL BWP with a large bandwidth for high-throughput applications. A UE may switch SL BWPs when the UE commences a SL transmission in a STRB that is associated with a different SL BWP. As shown in FIG. 3, a UE may apply a large SL BWP (301) in the flexible-symbol-based STRBs and autonomously switch to another SL BWP (302) in UL-symbol-based STRBs. The UE may switch (310) to the SL BWP (302) that is non-overlapping with the UL BWP (303) applied for UL transmissions during the UL-symbol-based STRBs. The UE may switch back (312) to the SL BWP 301 after the UL-symbol-based STRB.

According to an embodiment, a UE may be configured with a PSCCH frequency resource allocation that may be associated with each SL BWP. This may be configured by the network. According to another embodiment, a UE may be configured with a PSCCH frequency resource allocation independent of a SL BWP configuration, e.g. each SL BWP may include an identical PSCCH frequency resource allocation. Again, this may be configured by the network.

A UE may also switch SL BWPs based on sensing results. For example, a UE may perform a wide-band energy measurement of SL BWPs, e.g. measuring and evaluating BWP received signal strength indicators (RSSIs), and switch to another SL BWP when the measured metric exceeds a pre-configured threshold. This may reduce processing and time required to perform sensing per subchannels of each SL BWP.

In one embodiment, a UE may determine a transmission STRB pool from the set of STRB pools for one or a set of supported SL service types and applications based on the associated requirements for latency, reliability, range, etc. For example, a UE may determine a symbol-based transmission STRB pool for a low-latency transport block. The UE may determine a transmission STRB pool based on flexible slots for data transmission of large transport blocks with relaxed latency requirement, as the slot may provide more time resource and the large SL BWP associated with the flexible-slot-based STRBs may allow more frequency resource for the transmission of a large transport block. The UE may determine a transmission STRB pool based on both UL and flexible symbols to increase the number of STRBs available in each STRB pool period to achieve high reliability and/or longer range, e.g. by using repetition transmission and/or beamforming. The UE may select a transmission STRB pool different from that applied for sensing (the sensing STRB pool), as further disclosed herein.

According to one embodiment, a UE may dynamically determine a transmission STRB from a transmission STRB pool for a transport packet (TB) based on one or more of a priority of the TB including size of the TB, latency requirement of the TB, reliability requirement of the TB, range requirement, beamforming configuration, and/or candidate STRBs determined by the UE sensing, as described herein.

A UE may select a transmission STRB, from at least one candidate STRB within a SL transmission window, in accordance with the latency, reliability and/or range requirements discussed above. The at least one candidate STRB may be a STRB determined to be an available time resource based on UE sensing. A UE may determine a SL transmission STRB from a single candidate STRB, multiple consecutive candidate STRBs, and/or non-contiguous candidate STRBs. This determination may be based on one or more of pre-configured rules described herein including the schedule TB's priority, latency and/or reliability requirement, range setting, beamforming configuration, etc.

Figure 4:
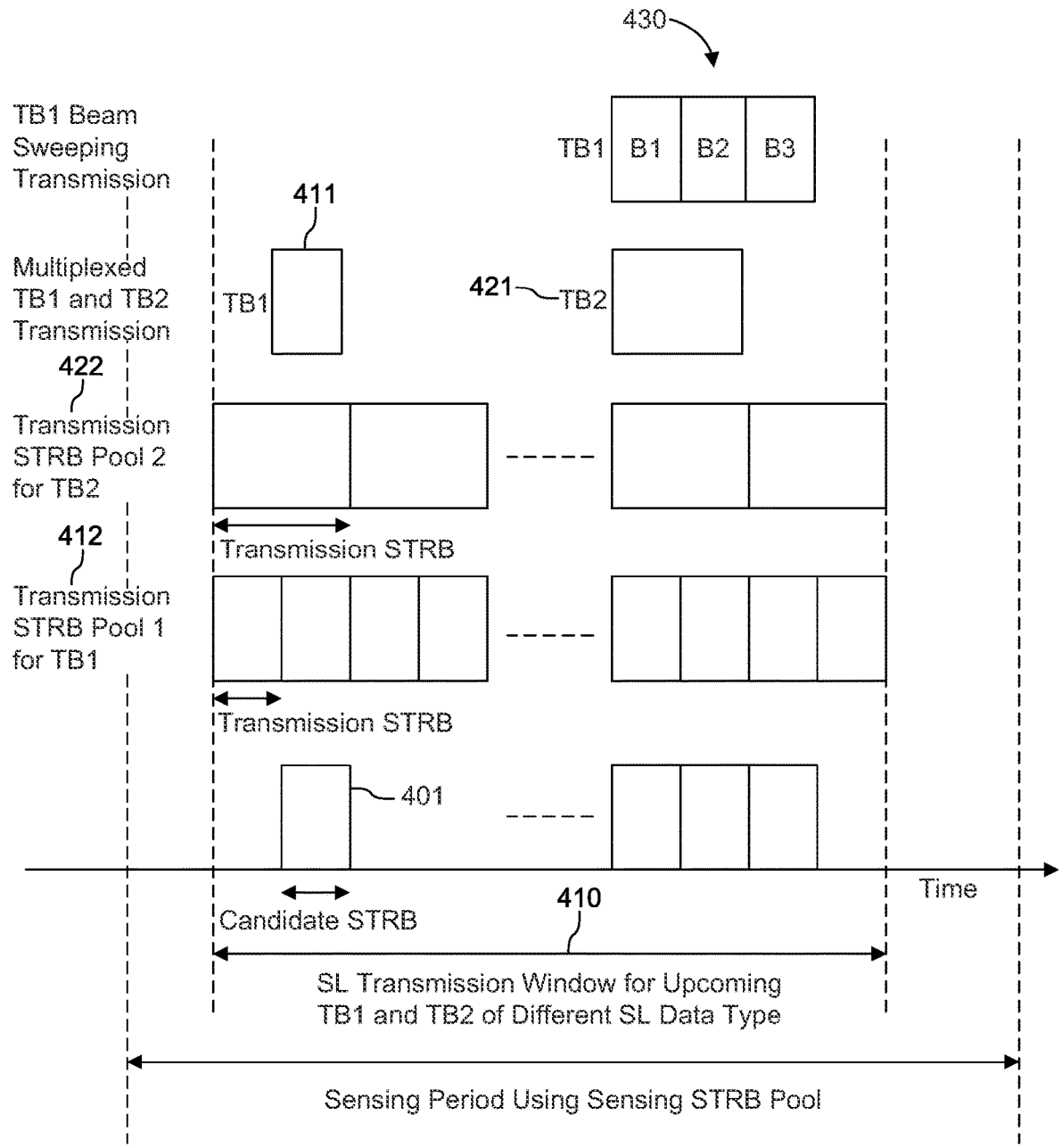
FIG. 4 is a diagram of an example UE determination of SL transmission STRB.

As an example, as shown in FIG. 4, a UE may select a first candidate STRB from a symbol-based STRB pool for TB1 transmission (indicated as a candidate STRB (401)) based on sensing in the SL transmission window (410). According to one embodiment, a UE may multiplex multiple transmission STRBs for different types of SL transmissions. The UE may support transmissions of multiple types of data, for example, of different latency requirements. For example, still referring to FIG. 4, a UE may determine a symbol-based transmission STRB pool for TBs associated with low latency transmission (TB1 (411) and STRB pool 1 (412)) and a slot-based transmission STRB pool for TBs associated with a high latency transmission (TB2 (421) and STRB pool 2 (422)). The UE may determine a transmission STRB for TB1 and TB2 based on the candidate STRBs (401) within a SL transmission window as shown in FIG. 4. A UE may determine a sensing STRB as a candidate STRB for transmission based on the sensing result. The UE may reserve the slot-based STRB for TB2 transmission in the SCI transmitted in the PSSCH associated with the TB1 transmission in the symbol-based STRB.

According to one embodiment, a UE may determine a spatial domain transmission filter, i.e. beamforming, configuration based on data type, priority, reliability and coverage. In one example, a UE may apply a wide or an omni-directional beam pattern for a broadcast transmission using a cell-specific STRB pool for data transmission of high reliability. In another example, a UE may apply beamforming to extend the transmission coverage and thus use beam sweeping to repeat the data transmission in each beam.

According to an embodiment, a UE may apply a spatial domain transmission filter configuration on a per-STRB-basis, i.e. one beam per STRB. A UE may be configured with a number of consecutive STRBs in one transmission window that may be used for beam sweeping of one TB. A UE may apply a beam sweeping transmission of one TB based on the UE beamforming capability, e.g. the number of spatial domain transmitter filters supported by the UE, and the availability of candidate STRBs based on sensing. In one example, a UE may adjust the spatial domain transmission filter configuration, e.g. increase or decrease the beam width, based on the number of the candidate STRBs in the transmission window. Thus, the UE may provide comparable spatial coverage, e.g. for a broadcast transmission, when the number of candidate STRBs varies in each SL transmission window.

Figure 5:
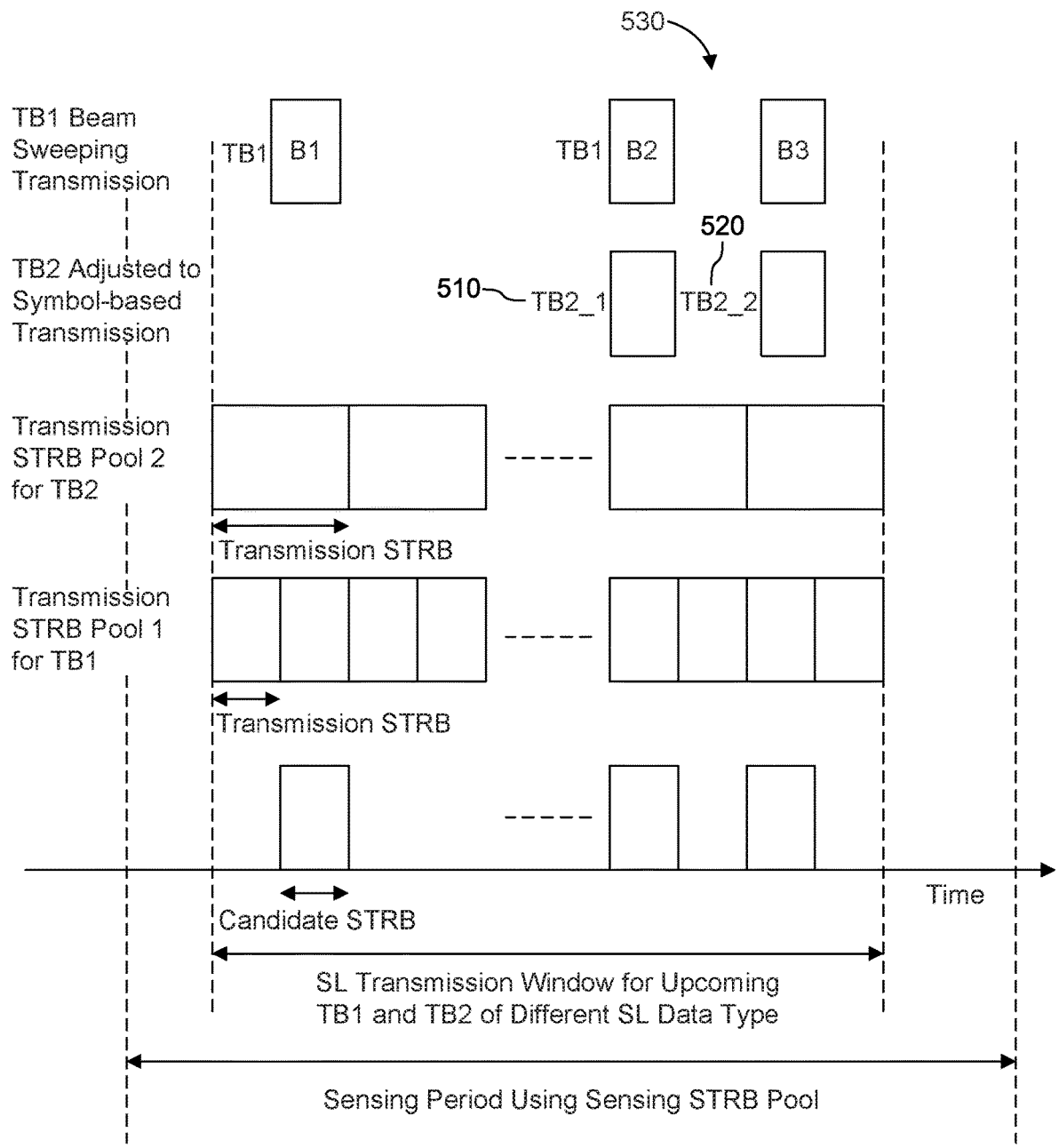
FIG. 5 is a is an illustration of a UE utilizing fragmented SL time resources.

In another embodiment, referring now to FIG. 5, a UE may utilize fragmented SL time resources and re-select a transmission STRB pool, e.g. from a slot-based transmission pool to a symbol-based transmission pool, or vice versa. As shown in FIG. 5, the UE may adjust the transmission of TB2 with a slot-based STRB pool and select transmission STRBs from a symbol-based transmission pool instead when no suitable slot-based candidate STRB may be available in the SL transmission window due to the time resource fragmentation. The UE may therefore break the slot-based TB2 transmission into two transmissions (510 and 520) using two 7-symbol-based STRBs from a symbol-based STRB pool. This may allow TB2 transmission to occur in the transmission window and thereby satisfy TB2's latency requirement. A UE may indicate in the SCI that multiple STRBs may be utilized for transmissions for a single TB either due to the STRB pool reselection as discussed above or TB repetition to provide time diversity. In another variation, the UE may use more frequency resources in the same transmission STRB pool rather than using multiple transmission STRBs.

According to another embodiment, a UE may apply beam sweeping in non-consecutive STRBs, e.g. when the UE may not have enough candidate STRBs in one SL transmission window. This is illustrated in FIG. 5. The UE may indicate in SCI the resource reservation for an identical TB with a different spatial domain transmission filter configuration. An example of SL transmission of one TB using beam sweeping over non-consecutive STRBs (530) is illustrated in FIG. 5. An example of SL transmission of one TB using beam sweeping over consecutive STRBs (430) is illustrated in FIG. 4.

In one embodiment, a UE may be configured with a set of PSCCH transmission instances in each slot for the determined STRB pools. The configuration may include the start symbol and number of symbols of the PSSCH transmission instances. A UE may transmit one PSCCH on a per-STRB-basis according to the configured PSCCH transmission instance based on the selected STRB pool. In one example, a UE may be configured with a PSCCH transmission instance that may consist of a number of symbols at the beginning of each slot as shown in FIG. 6 for a slot-based STRB pool for UE1 (610) and UE2 (620).

Figure 6:
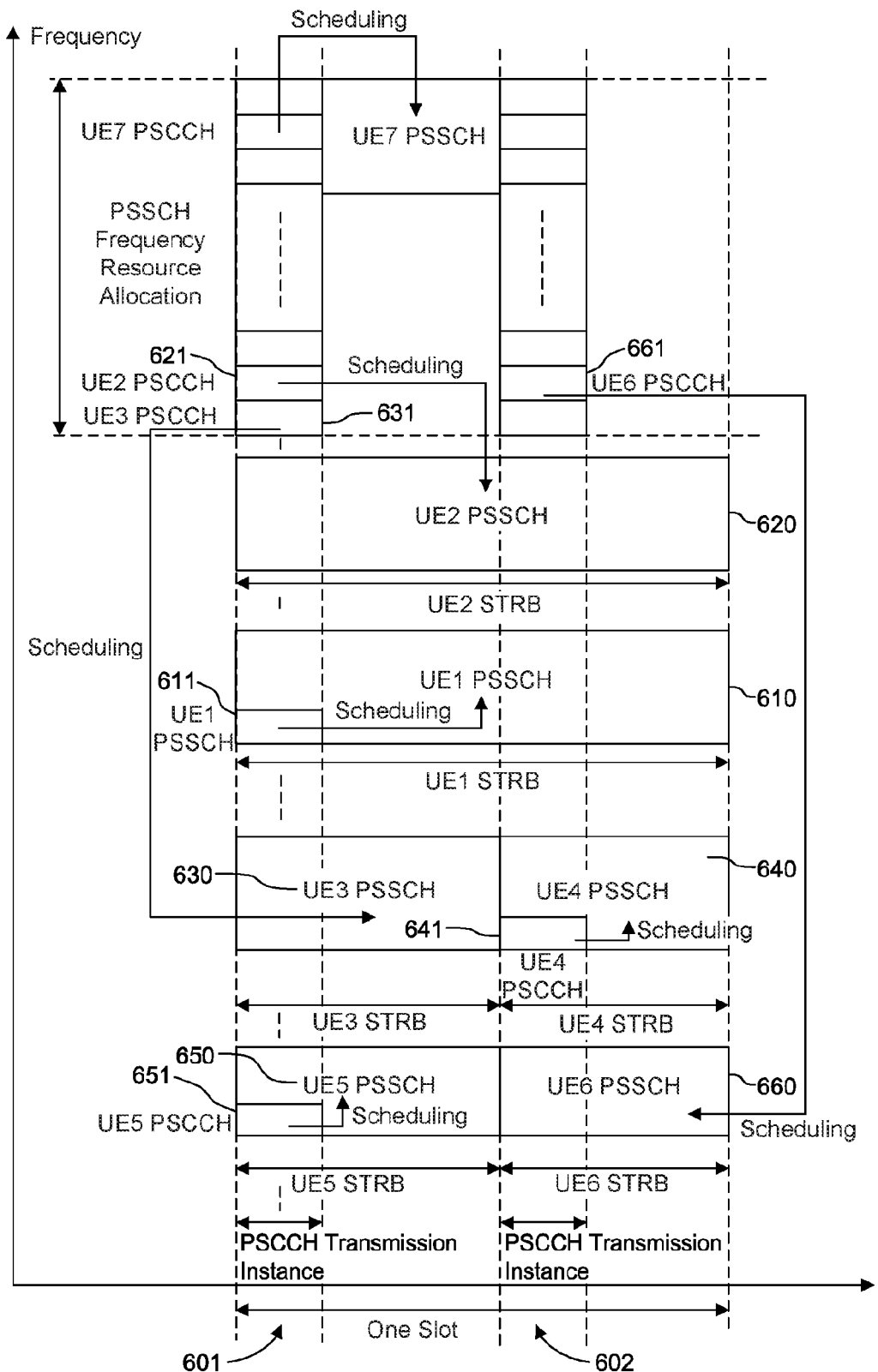
FIG. 6 is a diagram of example Physical SL Shared Channel (PSSCH) transmission instances and frequency resource allocation.

In one embodiment, with reference to FIG. 6, a UE may determine N PSCCH transmission instances in each slot based on the STRB duration. For example, a UE may determine 2 PSCCH transmission instances at symbol 0 (601) and symbol 7 (602) in each slot for a 7-symbol-based STRB pool as shown in FIG. 6 for UE3 (630), UE4 (640), UE5 (650) and UE6 (660).

A UE may be configured with a PSSCH frequency resource allocation in each BWP, e.g. UE2 (621), UE3 (631) and UE6 (661) shown in FIG. 6. A UE may determine the PSCCH frequency resource within the allocation based on the selected transmission STRB pool and sensing results. In another example, a UE may be configured to transmit a PSCCH in a frequency resource allocation adjacent to the associated PSSCH, e.g. UE1 (611), UE4 (641) and UE5 (651) shown in FIG. 6.

A UE may determine the frequency resource allocation, e.g. number of RBs, based on the duration of the corresponding PSCCH transmission instance. For example, a UE may determine to use more RBs for PSCCH transmission instance of one symbol than that used for PSCCH transmission instances of two symbols. By adapting the frequency resource allocation, a UE may ensure the power spectrum density of the PSCCH symbols may not vary in relation with the duration of PSSCH transmission duration.

A UE may determine its SCI carried in a PSCCH that may include STRB information, such as, for example, indication of slot-based STRBs or symbol-based STRBs, duration of STRBs in terms of number of symbols, and/or multi-STRB scheduling information for TB repetition and multiple STRBs used for one TB transmission including a time interval between these STRBs. The PSCCH may include PSSCH time resource information, such as, for example, a PSSCH starting symbol index, an offset in terms of number of symbols between the last PSCCH symbol and the first PSSCH symbol, a duration of PSSCH in terms of symbols, and/or PSSCH slot index. The PSCCH may include PSSCH frequency resource information such as, for example, a SL BWP indication, and/or frequency resource location of the initial transmission. The PSCH may include a PSSCH beamforming configuration such as, for example, an indication of beam sweeping, single wide or omni-directional beam, a beam indication based on PSSCH QCL relationship with a SL beam reference signal, and/or a SL synchronization or DMRS of the associated PSCCH. The PSCCH may include PSSCH data information such as, for example, a service type indication, and/or data priority information. The PSCCH may include a PSSCH transmission format, such as, for example modulation and coding scheme (MCS), and/or frequency resource location of the initial transmission. The PSCCH may include PSSCH retransmission information such as, for example, a time gap between an initial transmission and a retransmission, and/or a frequency resource location of the retransmission. The PSCCH may include resource reservation information for the next TB transmission such as, for example, a reservation indication of a time interval between the transmission STRB and the reserved STRB, a reservation indication of properties of the reserved STRB including a duration, a reservation indication of the next TB being an identical TB with a different beam for beam sweeping, and/or a reservation indication of a block of consecutive STRBs including number of blocks. The PSCH may include a PSSCH destination identity such as, for example, UE identity information for unicast transmission, and/or service identity information.

A UE may generate SCI specific for each data application that the UE is running. For example, one SCI format for low-latency traffic may be generated and another SCI format for a large TB transmission may be generated.

According to another embodiment, a UE may determine the priority handling when the UE may receive a DCI format 0_0 or DCI format 0_1 scheduling a UL transmission overlapping in the time domain with the above-discussed selected transmission STRB. This may occur when the transmission STRB is based on UL symbols and flexible symbols. Additionally or alternatively, a UE may determine the priority handling when the UE may receive a DCI format 1_0 or DCI format 1_1 scheduling a DL reception overlapping in the time domain with the above-discussed selected transmission STRB. This may occur when the transmission STRB is based on flexible symbols.

A UE may be configured with a priority threshold for the priority handling between SL and Uu operations when the UL transmission or DL reception are slot-based and overlap with a slot-based STRB or symbol-based transmission STRB, e.g. a slot-based-UL-grant and a slot-based-STRB, a slot-based-UL-grant and a symbol-based-STRB located within the same slot.

A UE may be configured with a priority threshold for priority handling between SL and Uu operations when the UL transmission or DL reception are symbol-based and completely overlap with the transmission STRB, e.g. using same set of symbols. The UE may cancel the SL transmission and perform the UL transmission or DL reception as scheduled when the priority of the SL TB to transmit in the selected transmission STRB is lower than the configured threshold. The UE may not perform the UL transmission or DL reception and continue with SL transmission when the priority of the SL TB to transmit in the selected transmission STRB is higher than the configured threshold.

A UE may be configured with a priority threshold for the priority handling between SL and Uu operations when the UL transmission or DL reception are symbol-based and partially overlap with a symbol-based transmission STRB, e.g. overlapping over one or more symbols. The UE may determine if it may re-select one or multiple SL transmission STRBs from the same or another transmission STRB pool that are indicated as candidate STRBs. The UE may apply puncturing or rate matching to transmit the scheduled SL TB in the non-overlapping symbols and proceed with both SL transmission and UL transmission/DL reception via the Uu interface. The UE may include the information about the adjusted transmission in the SCI in PSCCH. When STRB re-selection and TB transmission adjustment is not available, the UE may cancel the SL transmission and perform the UL transmission or DL reception as scheduled when the priority of the SL TB to transmit in the selected transmission STRB may be lower than the configured threshold. Alternatively or in addition, when STRB re-selection and TB transmission adjustment may not be available, the UE may not perform the UL transmission or DL reception and continue with SL transmission when the priority of the SL TB to transmit in the selected transmission STRB is higher than the configured threshold.

According to one embodiment, a UE may determine candidate resources for SL transmission in terms of time resource, e.g. available STRB in the sensing STRB pool, frequency resource, e.g. SL BWP, location of available sub-channel, RB bundle or RB within the SL BWP, and/or spatial resource, e.g. spatial domain transmission filter configuration used for the direction associated with the candidate STRB and frequency resource locations.

A UE may be configured to perform sensing with a periodicity, e.g. of a SFN cycle, to determine the candidate resource. A UE may continuously perform sensing in each sensing period and a UE STRB-base sensing may include determination of a sensing STRB pool.

A UE STRB-based sensing may include determination of UE spatial domain receiver filter configuration when UE beamforming-based sensing is configured. A UE may determine an integer number of sensing STRB pools within the configured sensing period to enable receiver beam sweeping for monitoring. A UE may also determine such a configuration based on the SL service type and/or data application. For example, for high reliability SL data transmission, a UE may determine to use a wide or omni-directional beam.

A UE STRB-based sensing may include a determination of a frequency resource location for monitoring of both PSCCH and PSSCH based on the configuration regarding UE SL Resource Determination. A UE may determine one or multiple SL BWPs for sensing and may switch BWP based on a per-BWP energy measurement and pre-configured threshold.

A UE STRB-based sensing may include monitoring and decoding PSCCH in each sensing STRB of the sensing STRB pool and, upon PSCCH detection, obtain SCI content and measurement of a signal quality metric of the associated PSSCH, e.g. RSCP, RSSI, SNR, etc.

A UE STRB-based sensing may include determination of a candidate resource based on information from the SCI including transmission of STRB information, PSSCH frequency resource location, PSSCH beam sweeping indication, a priority of the detected PSSCH data, and/or a resource reservation indication. The determination of a candidate resource may be based on measured associated PSSCH signal quality and/or information of the scheduled SL transmission including priority of the scheduled TB, reliability required for the scheduled TB, latency required for the scheduled TB, and/or spatial domain transmission filter configurations.

A UE may perform such determination in each sensing STRB with successful PSCCH decoding. In another example, a UE may perform such determination in one sensing STRB, and based on the SCI information the UE may determine if a set of subsequent sensing STRBs may be candidate STRBs without processing the SCI information of those sensing STRBs. For example, when a UE detects an indication of resource reservation of TB repetition within the sensing period, the UE may exclude the indicated STRBs from the candidate STRBs without further processing of these STRBs. In another example, when a UE detects a beam sweeping indication, it may exclude the indicated sweeping STRBs used for sweeping from the candidate STRBs without processing of these STRBs.

A UE may determine a STRB pool for SL sensing and reception based on the properties of supported SL service types and applications including priority of the data, latency requirements, reliability requirements, beamforming configurations, and/or a minimum STRB duration supported by the determined STRB pools. As an example, a UE may determine a sensing STRB pool with a minimum STRB duration based on both UL symbols and flexible symbols, e.g. 2-symbol-UL-flexible-symbol-based STRB pool for SL reception. The benefit may be that the UE may be able to receive low latency data as required by the supported SL service types and applications. Sensing with a minimum STRB duration may provide adequate granularity to allow the UE more flexible selection of transmission STRB pools. A UE may determine a transmission STRB from a transmission STRB pool that may have different STRB duration than that of the sensing STRB pool.

A UE may be configured with a set of PSCCH frequency resource locations for each configured SL BWP and associated with PSCCH transmission instances. A UE may perform a blind decoding of SCI based on a combination of the PSCCH transmission instances and PSCCH frequency resource location. For example, a UE may decode SCI in two PSCCH transmission instances starting at symbol 0 and symbol 7 of each slot based on a 7-symbol-based STRB sensing pool and at each transmission instance the UE may search the SCI in the associated frequency resource locations. The association between PSCCH transmission instance and frequency resource location may allow distribution of different SCI formats in different PSSCH resources to reduce congestion and processing. For example, for the PSSCH transmission occasion starting at symbol 0, a UE may be configured with separate PSCCH frequency resource locations for SCI transmissions based on symbol-based or slot-based STRB pool.

A UE may be configured with SCI formats associated with the PSCCH transmission instances and/or PSCCH frequency resource location. Accordingly, the UE may determine which SCI to detect based on the PSCCH transmission instances and/or PSCCH frequency resource location. To limit UE processing, a UE may be configured with a maximum number of PSCCHs to decode in each PSCCH transmission instance associated with the UE's transmission and/or sensing STRB pools.

According to one embodiment, a UE in a SL unicast transmission may transmit SCI that may only be decoded by another UE based on UE identity and/or service identity information in the SCI. For example, a UE may transmit PSCCH with scrambling configured with such unicast-specific information. Thus, the unicast PSCCH may not be decoded by all UEs in proximity that receive the transmission.

In order to enable sensing on the unicast transmission, a unicast UE may transmit a non-unicast-transmission-specific DMRS of the PSCCH such that a UE may obtain a signal measurement of this DMRS but may not use it to decode the PSCCH. Alternatively or in addition, in order to enable sensing on the unicast transmission, a unicast UE may transmit a unicast-specific SL synchronization signal (SLSS) and/or a unicast sensing signal (USS) indicative of an on-going unicast transmission, e.g. a ZC sequence with parameters such as sequence index and/or cyclic shifts pre-configured for unicast transmission. A UE may transmit the signal without an associated PSCCH and/or PSSCH.

A UE may be configured with resource reservation information associated with certain parameters of PSCCH DMRS/SLSS/USS. The information may include a resource reservation interval, STRB information, and/or frequency resource location. For example, a UE may select a sequence of PSCCH DMRS/SLSS/USS that may indicate the reservation interval. Also, the PSCCH DMRS/SLSS/USS frequency resource location may be configured to be identical to the reserved transmission. A UE may be configured with a mapping between STRB information and PSCCH DMRS/SLSS/USS parameters such as sequence type, sequence index, and/or cyclic shift.

Therefore, a UE may perform sensing of a unicast transmission based on the energy measured on the detected PSCCH DMRS/SLSS/USS. When a UE detects such a sequence in a sensing STRB, the UE may exclude the SL resource indicated implicitly by the detected parameters of the PSCCH DMRS/SLSS/USS from candidate STRBs if the energy measured on the detected signal may exceed a pre-configured threshold.

Figure 7:
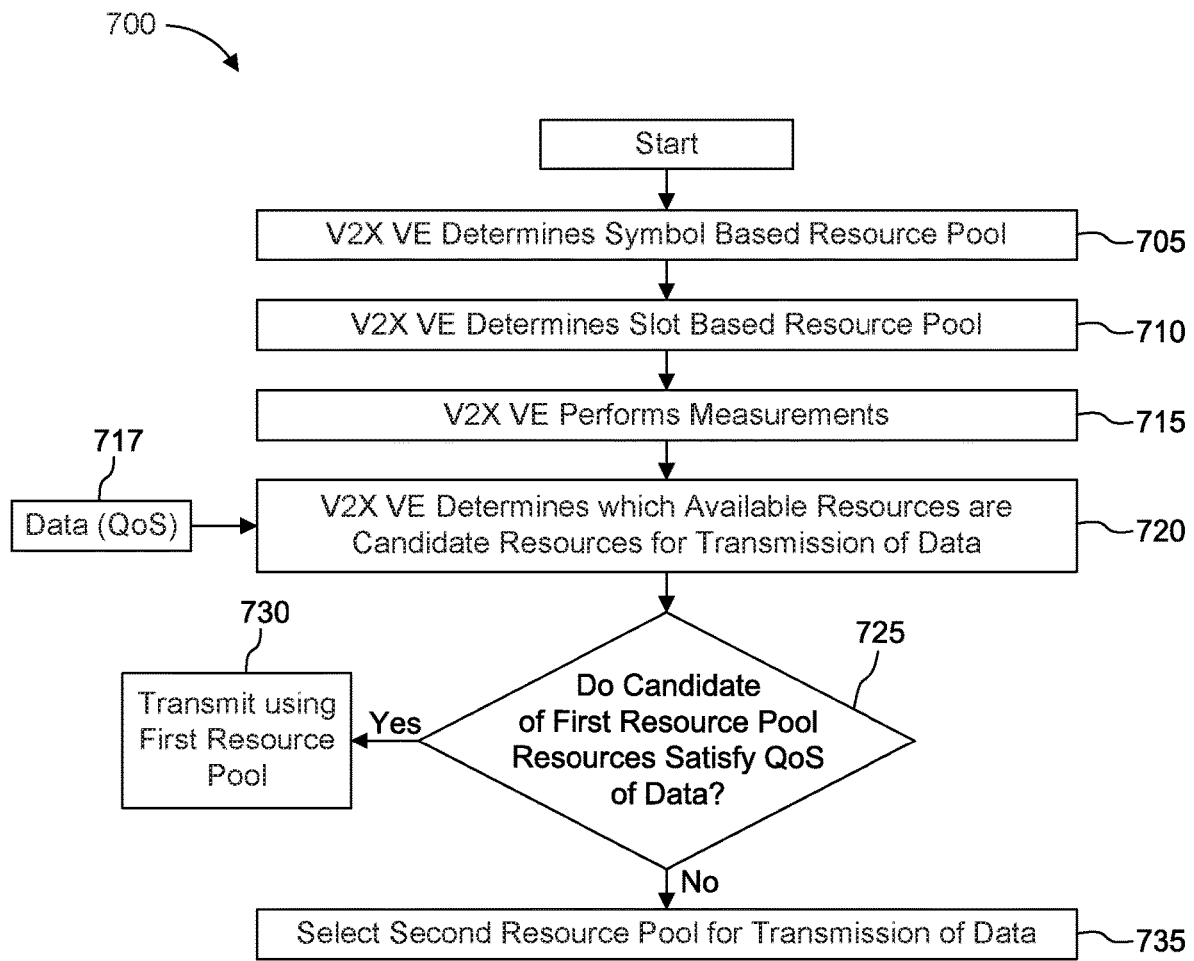
FIG. 7 is a method flow diagram of one embodiment implemented by a V2X UE.

Referring to FIG. 7, a method flow diagram of one embodiment is shown. The method 700 begins when a vehicle to everything (V2X) user equipment (UE), that is configured to operate in a fifth generation (5G) wireless network, determines a symbol-based resource pool for SL transmission to another V2X UE at step 705. The V2X UE also determines a slot-based resource pool for sidelink transmission to another V2X UE at step 710. The V2X UE may use any of the disclosed methods described herein to achieve steps 705 and 710. The V2X UE performs measurements of the symbol-based resource pool and the slot-based resource pool to determine available resources at step 715. The V2X UE determines, based on a quality of service (QoS) associated with data for transmission 717, which available resources are candidate resources selectable for transmission of the data at step 720. The V2X UE determines whether candidate resources of a first resource pool (i.e. slot-based resource pool or a symbol-based resource pool) will be sufficient for the QoS of the data for transmission at step 725. If the candidate resources in the first resource pool are sufficient for the QoS requirement of the data for transmission, the data is transmitted using the first resource pool at step 730. If the candidate resources in the first resource pool are not satisfactory for the QoS of the data for transmission, the V2X UE selects a second resource pool (i.e. symbol-based resource pool or slot-based resource pool, respectively) for transmission of the data, where the second resource pool resources are satisfactory for the QoS of the data for transmission. Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A first vehicle to everything (V2X) wireless transmit/receive unit (WTRU), the WTRU comprising:
    a transceiver; and
    a processor, coupled to the transceiver, configured to determine a type of sidelink (SL) time resource block (STRB) of an available resource pool including at least one of undesignated flexible symbols or assigned uplink (UL) symbols;
    the processor configured to select a first bandwidth part (BWP) for use in SL communication with a second WTRU when the STRB type is a flexible symbol based STRB;
    the processor configured to select a second BWP for use in SL communication with the second WTRU when the STRB type is an uplink (UL) symbol based STRB, wherein the first BWP is larger than the second BWP; and
    the processor configured to use at least one of the first BWP or the second BWP to perform a SL transmission to the second WTRU, wherein the first BWP and second BWP are part of a set of BWPs associated with at least one STRB pool based on at least one STRB property.

2. The first V2X WTRU of claim 1, wherein the first WTRU has a PSCCH frequency resource allocation associated with each of the first BWP and second BWP.

3. The first V2X WTRU of claim 1, wherein each BWP includes an identical PSCCH frequency resource allocation.

4. The first V2X WTRU of claim 1, wherein the processor is further configured to use a third BWP for SL communication with the second WTRU based on sensing results from a wide-band energy measurement of SL BWPs.

5. The first V2X WTRU of claim 4, wherein on a condition that a received signal strength indicator (RSSI) of the wide-band measurement of SL BWPs exceeds a pre-configured threshold, the processor further configured to use the third BWP for SL communication with the second WTRU.

6. The first V2X WTRU of claim 1, wherein the set of BWPs is a set of SL STRBs that are non-overlapping with any UL BWPs for UL-slot-based STRBs.

7. The first V2X WTRU of claim 1, wherein the set of BWPs is a set of SL STRBs that are non-overlapping with any UL BWPs for UL-symbol-based STRBs.

8. The first V2X WTRU of claim 1, wherein the set of BWPs is a set of SL STRBs that are partially or completely overlapping with an UL BWP for flexible-slot-based STRBs.

9. The first V2X WTRU of claim 1, wherein the set of BWPs is a set of SL STRBs that are partially or completely overlapping with an UL BWP for flexible-symbol-based STRBs.

10. A method for use in a first vehicle to everything (V2X) wireless transmit/receive unit (WTRU), the method comprising:
   determining a type of sidelink (SL) time resource block (STRB) of an available resource pool comprising at least one of undesignated flexible symbols and assigned uplink (UL) symbols;
   on a condition that the STRB type is a flexible symbol based STRB, selecting a first bandwidth part (BWP) for use in SL communication with a second WTRU;
   on a condition that the STRB type is an uplink (UL) symbol based STRB, selecting a second BWP for use in SL communication with the second WTRU, wherein the first BWP is larger than the second BWP; and
   using at least one of the first BWP and the second BWP to perform a SL transmission to the second WTRU, wherein the first BWP and second BWP are part of a set of BWPs associated with at least one STRB pool based on at least one STRB property.

11. The method of claim 10, wherein each of the first BWP and second BWP is associated with a PSCCH frequency resource allocation.

12. The method of claim 10, wherein each BWP includes an identical PSCCH frequency resource allocation.

13. The method of claim 10, further comprising using a third BWP for SL communication with the second WTRU based on sensing results from a wide-band energy measurement of SL BWPs.

14. The method of claim 13, further comprising on a condition that a received signal strength indicator (RSSI) of the wide-band energy measurement of SL BWPs exceeds a pre-configured threshold, using the third BWP for SL communication with the second WTRU.

15. The method of claim 10, wherein the set of BWPs is a set of SL STRBs that are non-overlapping with any UL BWPs for UL-slot-based STRBs.

16. The method of claim 10, wherein the set of BWPs is a set of SL STRBs that are non-overlapping with any UL BWPs for UL-symbol-based STRBs.

17. The method of claim 10, wherein the set of BWPs is a set of SL STRBs that are partially or completely overlapping with an UL BWP for flexible-slot-based STRBs.

18. The method of claim 10, wherein the set of BWPs is a set of SL STRBs that are partially or completely overlapping with an UL BWP for flexible-symbol-based STRBs.

* * * * *